UNITED STATES PATENT OFFICE.

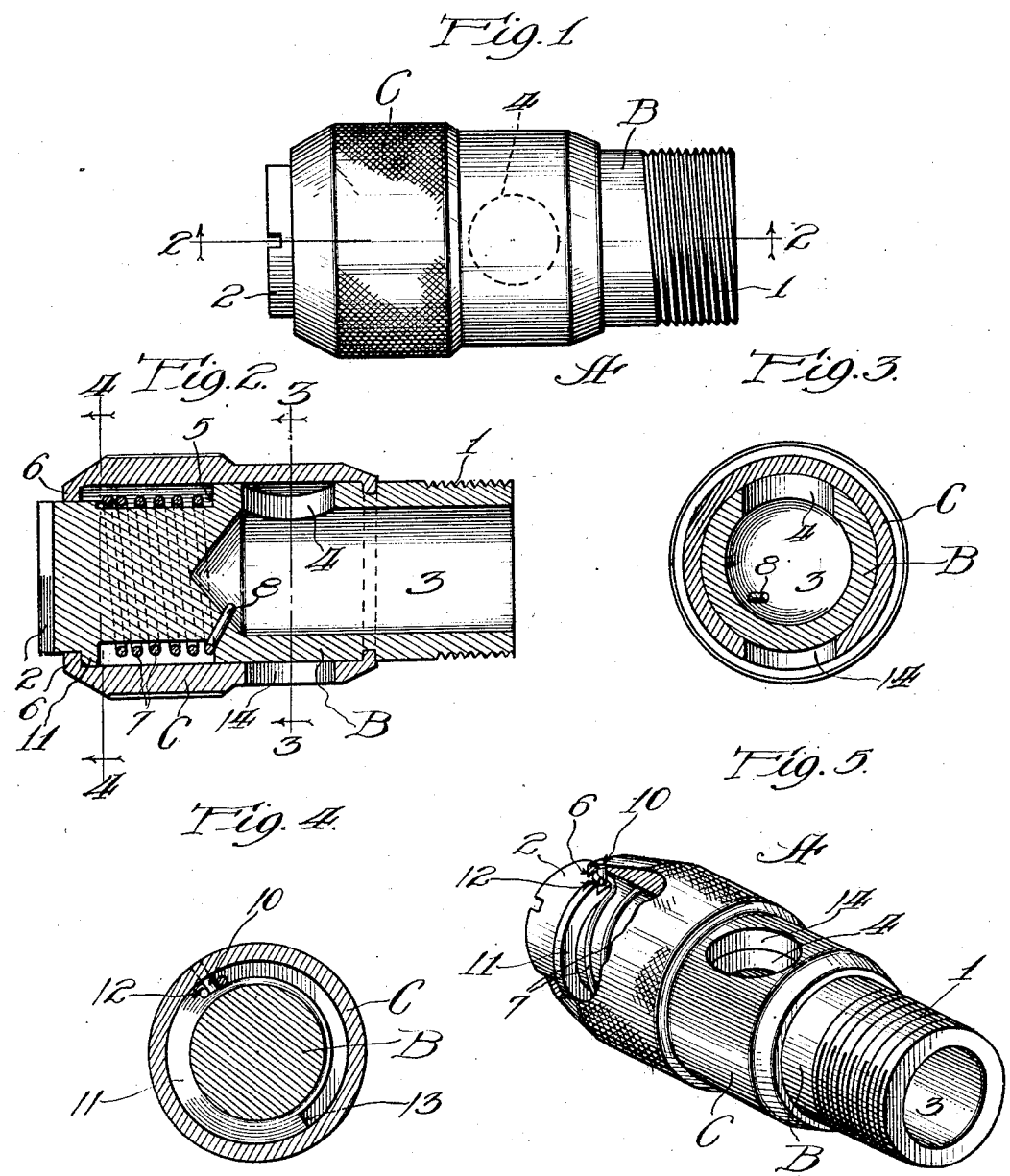

ANTON K. FIXARY, OF CHICAGO, ILLINOIS, ASSIGNOR, BY DIRECT AND MESNE ASSIGNMENTS, TO IMPROVED OIL CUP MANUFACTURING COMPANY, A CORPORATION OF ILLINOIS.

OIL CUP.

1,410,398.   Specification of Letters Patent.   Patented Mar. 21, 1922.

Application filed May 21, 1921. Serial No. 471,382.

*To all whom it may concern:*

Be it known that I, ANTON K. FIXARY, a citizen of the United States, residing at Chicago, in the county of Cook and State of Illinois, have invented certain new and useful Improvements in Oil Cups, of which the following is a specification, reference being had to the accompanying drawings, and to the reference characters marked thereon, which form a part of this specification.

This invention relates to improvements in oil cups. The principal object of my invention is to provide a construction having two members relatively movable, one upon the other, and each provided with an opening or passageway through which, when the openings register, the oil may be fed to an oil chamber formed in one member, together with means whereby the movable part, upon being released by the operator, be instantly restored to its normal position, in which the passageways are out of register and the opening in one of the members closed or covered by the other member.

Another object of the invention is to provide means for preventing the movable part from being rotated in either direction more than to a predetermined extent.

Another object of the invention is to provide an oil cup that will perform its intended functions and that will have the fewest number of parts, have nothing complicated to get out of order and require no adjustment after being set in position.

To the attainment of these objects and the other advantages, the invention consists in the devices and combination of devices herein illustrated and described, and more particularly pointed out in the appended claims.

In the drawing:

Fig. 1 is a top or plan view of an oil cup constructed in accordance with my invention.

Fig. 2 is a longitudinal, central, vertical sectional view of the same, taken in the plane of the line 2—2 of Fig. 1, and looking in the direction indicated by the arrows.

Fig. 3 is a transverse, vertical sectional view of the same, taken in the plane of the line 3—3 of Fig. 4, and looking in the direction of the arrows.

Fig. 4 is a transverse, vertical sectional view taken upon the plane of the line 4—4 of Fig. 2.

Fig. 5 is a perspective view, partly broken away, showing the two parts in relatively different positions with respect to each other than these parts are shown in Fig. 1.

Reference to said drawings: A represents the oil cup as a whole, the same consisting of two parts,—a body member B and an exterior rotatable sleeve member C. The body member B is provided at one end with a shank or connection 1, which is exteriorly screw threaded, and by means of which said body member may be attached to a fixed support, such as a machine bearing or other part to which oil is to be fed. In the instant case, said attachment may be conveniently effected by means of the screw head or nut 2 formed in the other end of the body member B. Extending inwardly and longitudinally from the connecting end 1 of the body B is an open recess, forming an oil well or chamber 3. Oil may be poured into the chamber 3 through an aperture or conduit 4, located in the wall of the body B, in open communication with the chamber 3. Between the conduit 4 and the screw head 2, the body member B is somewhat reduced in diameter, as indicated at 5, whereby there is provided an annular recess.

The rotatable sleeve member C is supported upon and surrounds the body member B. It has a firm bearing on the member B, in this instance from a point near the connecting end 1 to a point beyond said recess, thus covering the latter. The sleeve C is provided, at one end, with an inturned, annular flange 6, which rests upon the slightly reduced portion 5 of the body B, located adjacent to the screw head 2. There is thus formed between the inside of this end of the sleeve member C and the reduced portion of the body B, ample space for a spring 7, which spring is coiled about the body B. One end of the spring 7 is secured to the body B at 8 and its other end is secured to the rotatable sleeve C by wrapping its end around the pin 10. The normal tension of this spring, so connected to the two parts B and C, will hold the latter in a predetermined fixed position. When the rotatable sleeve member C is turned about its longitudinal axis around the body member A, tension is placed upon the spring 7. Immediately the operator releases hold of the sleeve C, the spring will therefore exert sufficient power to automatically rotate the sleeve C back to its first or normal position.

Upon the reduced portion 5 of the body member B is a circumferential flange or rib 11, which, however, only extends part way around the body member. It bears on one side against the inside surface of the circumferential flange 6. The pin 10 suitably secured in the rotatable sleeve C, more fully shown in Figs. 4 and 5, extends into the space between the two members B and C, and is adapted for contact with the ends 12 and 13 of the rib 11, which ends act as fixed stops or shoulders.

In the normal position of the oil cup, this pin 10 with the end of the spring 7 about it, will abut or rest against the end 12, and when the sleeve C is rotated, in the direction indicated by the arrow, Fig. 4, the projecting end of the pin 10 will abut or rest against the end 13 of the rib 11. By this arrangement it will be understood that the operator may give the sleeve C a half revolution in one direction, the extent of the movement being determined by the location of the abutting end 13. When the pin 10 has traveled from its position, resting against the shoulder 12, to the position where it rests against the shoulder 13, the rotation of the sleeve C in that direction is arrested. When the sleeve C is released by the operator, it will automatically be given a half revolution in the opposite direction, and travel back to its original position under the influence of the spring 7. Its reverse, automatic travel back to normalcy will be arrested when the pin 10 encounters the shoulder 12 of the rib 11.

Through the wall of the rotatable sleeve C is an oil receiving passageway 14, so located with respect to the location of the shoulders 12 and 13 and with the location of the conduit 4 in the body member, as to register with said conduit 4 only when the sleeve member C is in one position.

In Fig. 4, the oil receiving passageway 14 and the conduit 4 are shown in diametrically opposite positions; that is to say, the latter is closed by the solid or unapertured tubular part of the sleeve C; while in Fig. 5, the oil receiving passageway 14 and the conduit 4 are shown in register. When held by the operator in the position shown in Fig. 5, a suitable lubricant, such as oil, poured into the passageway 14, will pass through the conduit 4 and into the receiving well or oil chamber 3. When the desired quantity has been placed in said chamber, the operator releases his hold upon the member C which, as before explained, will automatically be returned to its normal position and seal the conduit 4.

It will be observed that there are but four parts to my oil well, namely: the members B and C, the spring 7 and the pin 10; that the pin and the spring are both enclosed and so located as not to be easily tampered with; that the arrangement is such that any size and strength of spring desired may be readily employed, without changing the principle of the device; that the rotation of the sleeve C in either direction is limited by the location of the flange ends 12 and 13; that the conduit 4 is completely sealed excepting when the operator desires otherwise; that the tension of the spring 7 will be such as to insure the constant or normal position of the sleeve, excepting when the latter is manually rotated by the operator; that the "fit" of the sleeve upon the body member is such as to prevent grit and dust particles from entering between the contacting surfaces; that the device is simple and has no complicated parts to get out of order; that it is relatively cheap to manufacture, and is perfect in its operation.

I claim as my invention:

1. The improved oil cup comprising a tubular body member, means for securing the same to a support, a longitudinally disposed oil well or receptacle in the body member open at one end, a conduit leading outwardly from said oil well, a circumferential flange extending partly around the body member, its end forming a stop or shoulder, the body member being somewhat reduced in diameter adjacent to one end to provide a spring support, a spring coiled about the reduced portion of the body member, a sleeve member surrounding the body member and covering the spring and normally covering said conduit, means for connecting the spring ends, one to the body and the other to the sleeve, a radially disposed passageway through the sleeve member adapted to register with said conduit when the sleeve member is rotated, a pin on the sleeve member projecting inwardly and adapted to contact with said stop or shoulder.

2. The improved oil cup comprising a sleeve member and a tubular body member, the latter being provided with means for connecting it to a support, an interior oil well or receptacle in the body member, a radially disposed conduit therethrough in communication at one end with said receptacle, means including a spring for permitting rotary movement in either direction of the sleeve member with respect to the body member, the movement in one direction being manual and in the other direction automatic, a passageway through the sleeve wall adapted to be brought into register with the conduit, the spring being operatively connected with the sleeve and the body members, a pin on the sleeve member and stops in the body member against which said pin may contact, one end of the spring being connected to the body member and the other end to said pin.

3. In an oil cup having a body member and a sleeve member and relative rotary movement between the two members, and registering apertures in each member, of a circumferential flange upon and partly surrounding one member, and a pin on the other member adapted to engage the flange ends to limit the movement of the sleeve member.

In testimony, that I claim the foregoing as my invention I affix my signature, in the presence of two witnesses, this 19th day of May, 1921.

ANTON K. FIXARY.

Witnesses:
TAYLOR E. BROWN,
B. L. MACGREGOR.